United States Patent Office 3,112,200

Patented Nov. 26, 1963

3,112,200
PRINT-OUT COMPOSITIONS FOR PHOTOGRAPHIC PURPOSES

Eugene Wainer, Shaker Heights, Ohio
(2915 E. 79th St., Cleveland 4, Ohio)

No Drawing. Filed May 17, 1963, Ser. No. 281,346
6 Claims. (Cl. 96—90)

This invention relates to compositions of matter which are sensitive to light and suitable for photographic reproduction purposes. More particularly, the invention relates to the production of colored print-out images produced by exposing to light dry films formed from combinations of systems involving acid-base type indicators, organic halogen compounds and materials which contain hydrogen and oxygen, these materials usually being polymeric in nature.

A principal object of this invention is to effect a reaction between acid-base type indicators, suitable organic halogen compounds, and suitable materials containing hydrogen and oxygen so that under the influence of light, and particularly ultraviolet light, a change in color is produced. Further objects of this invention are to provide free radical systems which decompose under the influence of light to produce free radicals which are capable of initiating and developing the aforesaid color forming reaction; to develop this color forming reaction rapidly enough so that the total time of exposure, developing and fixing to a permanent and stable image does not exceed a few minutes; to provide systems in which the exposure and fixing stages may be accomplished by totally dry techniques; to provide modifications of these systems so that wet techniques may be used if desired; to provide print-out systems which are not only sensitive to ultraviolet light but also to visible light; to provide a range of color images which effectively blanket the visible spectrum range from complete absorption of light, such as black to specific colors such as blues, greens, yellows, reds, purples, and modifications thereof; to provide systems in which the desired color is developed by exposure to light and the facility for producing such color as the result of exposure to light of a similar wavelength is destroyed by the exposure of the system to strong infrared or heat; equally important as the above objects is the provision for free radical systems attached to polymeric substrates which may be used as initiators and accelerators of the photochemical action.

In the modern field of industrial, technical, and professional photography and photographic reproduction, the trend is toward higher speed, simpler processing, and systems and processing which require practically no skill in order to make them useful. Ideally, if all of the processing may be accomplished automatically entirely by use of radiant or thermal energy or combinations of both, the possibilities for error through use of complicated chemicals are thereby minimized or eliminated. Obviously, such type of dry processing exhibits further advantages of economics and solves problems in logistics, in that the transportation of carefully prepared, expensive, and bulky solutions of chemicals is not required. Through use of dry processing techniques, automatic equipment needed for accomplishing the desired end result of dry processing may be designed so as to be compact, low in cost, and sufficiently simple in design and construction so that worn out parts may be replaced readily and repairs accomplished easily by non-technical personnel. A final requirement is that such equipment and the sensitive surfaces being exposed in such equipment must permit the desired end result to be obtained in times not exceeding a few minutes and preferably not exceeding several seconds. In addition, the sensitive surfaces before exposure should have reasonable shelf stability. The images obtained after exposure, and fixing are required to be equally stable, and the exposed backgrounds should not be subject to fog on storage or normal handling.

Requirements as indicated in the foregoing paragraph are imposed in the photocopy field for blueprints and technical information, the reproduction of typed and printed pages, images obtained by transmission through microfilm the recording of information as obtained from XY devices in technical and laboratory areas, the direct recording of various transient events, and finally, and obviously the usual aspects of amateur photography.

Describing my invention first in general terms, I have found that "acid-base indicator materials," as hereinafter defined and illustrated, dissolved or dispersed in organic materials which contain oxygen and hydrogen, when mixed with certain organic halogen compounds, will, on exposure to light for durations of a few seconds produce the typical color change expected of the indicator as the result of a pH change from the basic to the acid side. I have found further that the color change for each indicator may be placed in the range where it most readily will change color on exposure to light in the generalized systems described above, by adding just sufficiently acid or base of specific nature which places the anticipated pH of the system just above that at which the color change will take place, and on subsequent exposure in the generalized system described, the anticipated color change then takes place. I have further found that various simple organic halogen compounds are effective for my purposes.

While I do not wish to be bound by any specific theory, it appears that in effect, these organic halogen compounds are free radical progenitors under the influence of light, and as a result of the formation of the free radical in the presence of materials which contain hydrogen and oxygen the end result of such reaction is the production of significant amounts of acid and water, as the result of reaction between the free radical and the oxygen and hydrogen containing material. It is not certain whether this is the actual reaction which is taking place, but this appears to be one plausible estimate of the course of the reaction. It is a further aspect of my invention that, when color producing systems are utilized as a result of exposure to light of the relatively far ultraviolet the system may be stabilized or fixed by overcoating the exposed film with a layer of a film former which does not contain oxygen, such as a polystyrene dope, for example. It is an important aspect of my invention that not only may systems be provided in which the initial color of the indicator is relatively light in hue and intensity, such as pale yellow or pale red, for example, and after exposure a very much deeper color such as blues, blacks, deep greens, or deep reds may be obtained, but also bleach-outs may be produced utilizing dyes which, on the basic side of their pH range of color, are deeply colored, and as a result of their exposure to light and the release of acid constituent, this deep color either changes to one of very much lighter hue and intensity, but actually, in some cases, may become completely colorless. In general, the times required for a system involving bleach-out relative to exposure are somewhat longer than those which involve print-out or which go through a significant color change of high contrast.

In general, the systems contemplated by me are sensitive to light not only in fully dried film form, but also when the entire system is disposed in a solvent such as acetone, alcohol, the glycols, or other oxygen containing solvents. Further, the effectiveness of the various agents described are further enhanced through the addition of suitable plasticizers which are compatible with water. Such plasticizers include glycerol, the glycols, the glycol ethers, polyhydric alcohols, and the like.

The systems outlined above are sensitive primarily to ultraviolet light. The useful sensitivity of such systems begins at about 4000 A. and the systems are particularly sensitive to radiation in a preferred range of 2500 to 3500 A. In many cases, this represents an advantage since it prevents fogging on continued exposure to diffuse daylight or ordinary roomlight and aids the stability of the exposed system under storage conditions. However, in many cases, sensitivity to the visible range is a desired characteristic, and this may be imparted by adding to the combination as described above a member which may or may not be an indicator, but which in itself will undergo a color change on exposure to light and which initially exhibits a yellow or pale yellow color. Increases in speed of the system, particularly in the ultraviolet, may also be obtained by adding ultraviolet absorbers as is common in the art. Such ultraviolet absorbers are complex ketones, benzil, stilbene derivatives, phenyl salicylate, benzoin, and the like. Usually amounts of such ultraviolet absorbers of the order of a tenth of a percent or less are sufficient for the purpose.

The systems to be described are usually transparent in nature and the colors which develop as a result of exposure to light are in themselves transparent, and they are chiefly effective for line copy purposes. A simulation of continuous tone may be obtained by making the film relatively thick and the ability to produce continuous tone in such thick films is enhanced if an ultraviolet absorber is included so that the variations in tone develop simply as the result of the greater or lesser amount of light which is passed by the filtering action of the ultraviolet absorber. Another means for obtaining continuous tone which is more generally effective is to add to the film an inert finely divided white pigment in amounts such that the total volume of the pigment does not exceed 35% of the volume of the finished dried film. Suitable inert white pigments, permitting the development of a broad scale of continuous tones, may be taken from the group including titanium dioxide, barium sulfate, silica, zirconium oxide, and the like.

As noted above, the systems of the present invention comprise three essential constituents namely: one or more acid-base type indicators; one or more organic halogen compounds; and a suitable oxygen and hydrogen containing base material, wherein the acid-base type indicator and organic halogen compound are dispersed or dissolved. The systems may, as above noted, also contain one or more additional materials which modify the basic system in any desired fashion as indicated above.

Since all of the various ingredients of the light sensitive composition are dispersed or dissolved in a suitable base or binder, this portion of the system will be described first. It is preferred that this be cellulose, or a cellulose derivative or a polymer of a vinylidene monomer of the types hereinafter specifically described. More uniform results are obtained if at least a portion and preferably all of the remaining ingredients are soluble in the binder.

The primary exceptions to this requirement are where a pigment for the development of continuous tone is added or where other inert fillers are added to increase opacity or to reduce the volatility of components. The types of binders and the recommended solvents for these binders are listed below in Table I. The indicated solvents for the binders have been chosen to produce a relatively low viscosity solution of the polymeric material in question for concentration of polymer in the range of 5 to 15% by weight of the solution (plastic plus solvent), and to insure as good solubility for all the reagents as possible.

TABLE I

| Binder | Solvent (Parts by volume) |
|---|---|
| 1. Cellulose acetate | 70 acetone plus 30 trichloroethylene. |
| 2. Cellulose triacetate | 70 acetone plus 30 trichloroethylene. |
| 3. Cellulose nitrate | 50 acetone plus 50 ethyl acetate. |
| 4. Ethyl Cellulose | 40 toluene plus 30 acetone plus 30 $CH_3OH$. |
| 5. Polyethylene glycol | Methyl alcohol. |
| 6. Polacrylate | 70 acetone plus 30$CH_3OH$. |
| 7. Polymethyl methacrylate | 40 ethyl acetate plus 30 acetone plus 30 toluene. |
| 8. Polyvinyl acetate | 40 acetone plus 40$CH_3OH$ plus 20 toluene. |
| 9. Polyvinyl alcohol [1] | Water. |

[1] In the case of PVA, emulsions are originally obtained on mixing as described subsequently. After thorough drying clear films are obtained.

It will be noted that each of the binders listed above contains hydrogen and oxygen, and this appears to be a requirement for carrying out the contemplated reactions. Materials which are non-oxygen containing materials have little or no effectiveness. For example, use of a polystyrene base for carrying out the reaction does not produce the desired color changes obtained readily with the plastics given in the table.

While these binders may be dispersed on substrates such as glass, paper, plastic films, and the like, the support itself may be a material which contains the oxygen and hydrogen necessary for the chemical reaction in question. For example, paper and cloth containing hydroxyl groups appear to be in this category and the desired results can be obtained by depositing the free radical source and the acid-base indicator on such paper and cloth. The paper and cloth then may be used in place of the oxygen and hydrogen containing plastic.

The second essential material in the compositions of the present invention is a suitable organic halogen compound. The organic halogen compounds found to be useful for the purposes of by invention are the type of organic halogen compounds which when exposed to light of suitable wavelength are decomposed photochemically to produce free radicals. The preferred compounds include carbon tetrabromide, iodoform, bromoform, chloroform, and carbon tetrachloride. Of these, the first two mentioned are the most useful since they are solids and may be retained in a plastic film in dissolved form substantially indefinitely. It appears that each of the named compounds decomposes under the influence of light, and particularly ultraviolet light, through the formation of two free radicals, one of which is a free radical halogen and the second is a free radical residue. Thus, for example, the free radicals obtained as a result of photo-decomposition of carbon tetrabromide would be the bromine free radical and the carbon tribromide free radical. It is believed that in the reactions to be described the bromine free radical or iodine free radical or chlorine free radical, as the case may be, is the active agent.

There is another group of organic halogen compounds which also produce free radicals in specified solutions on exposure to light, but in general this group is only mildly active and is effective in very much narrower ranges of pH than those previously listed. This group includes such compounds as tetrabrombutane, hexachlorethane, tetrachlortetrahydronapthalene, dichlorobenzene, dibrombenzene, and hexachlorbenzene, and may be used only with an acid-base type indicator which exhibits a complete change in color with a pH change of one or less.

Irrespective of the nature of the organic halogen compound which acts as a source of free radicals on exposure to light and produces, presumably, a halogen free radical and a free radical fragment, the color reactions obtained are always the same with the same indicator. This appears to indicate that the nature of the change which takes place involves a combination of a production of acid and the formation of water. Thus, carbon tetrachloride, carbon tetrabromide, and iodoform will each produce the same color change in Congo red.

The third essential constituent of the compositions of the present invention has been herein identified as an acid-base type indicator.

There are approximately 300 relatively complex organic materials whose color in solution may be made to change by changing the pH of the solution. From this group of materials certain selected members are utilized in analytical chemistry as indicators to establish the presence or absence of hydrogen ions, hydroxyl ions, or modifications thereof. Materials which are classed as indicators generally will exhibit color changes in relatively narrow ranges of pH so that completely articulated lists are now available covering increments of one to two units of change and spreading over a total range of pH from 0 to 14. These acid-base type indicator chemicals are generally made up in fairly dilute solutions and sometimes with the use of specific additions so that the indicator goes into solution more readily, and thus may be more readily utilized than if the indicator is available only as a dispersion of solid particles in an otherwise noncompatible solution. In this condition, the indicator colors obtained are generally quite stable on storage even if exposed to light and elevated temperatures as long as the pH does not change. Commonly, the indicators are utilized in water solutions only, in order to develop the anticipated change with change in pH which is usually accomplished by titration with either a source of hydrogen ions, such as an acid, or a source of hydroxyl ions such as a base, depending on the initial color and the pH range of change. Chemically, it is to be expected, though it is not well recognized, that even if only traces of water are present, the same type of color change should be obtained, identifying the fact that only minute traces of water are needed in order to produce a basis for the ionization which will permit the respective hydrogen or hydroxyl ion to produce the color change in question. As an example of this, an indicator such as Congo red may be dissolved in freshly distilled anhydrous methyl alcohol to produce a 1% solution. If the solution is then treated with anhydrous HCl produced by dehydration of 36% HCl in sulfuric acid, any color change which develops takes place slowly. However, if this same solution is then exposed very briefly to ordinary atmosphere which contains moisture, in a matter of seconds the profound color change from red to blue may be seen. The amount of moisture pickup under such conditions may be measured in fractions of a percent, and this appears to be more than adequate to cause the anticipated change to take place.

Referring now to the acid-base type indicators which may be utilized, these may be dispersed either in a plastic film or dispersed on a cellulose base. Virtually any of the known acid-base type indicators may be placed in a form so that effective color changes are experienced. However, some of the acid-base type indicators produce more striking changes than others, and the preferred list for the purposes of my invention are given in Table II with an indication of the color change which is experienced under conditions described later in the examples. It is significant to note that these color changes are generally equivalent to those which may be anticipated in the usual water solutions on titration with acid or base.

TABLE II

*Color Changes of Preferred Indicators*

SECTION II-A BLEACH-OUT

| Indicator | Color Change on Exposure to Halogen Free Radical | Alkali Addition | Acid Addition |
|---|---|---|---|
| Brilliant Green | Green to yellow | No | Yes |
| Eosin y | Red to yellow | No | Yes |
| Ethyl violet | White to blue-green | No | No |
| Do | Blue to yellow | No | Yes |
| Erythrosin B | Red to yellow | No | No |
| Methyl green | Green-blue to yellow | No | Yes |
| Crystal violet | Blue violet to green | No | Yes |
| Basic fuchsin | Red to colorless | No | Yes |
| Phenolphthalein | do | Yes | No |
| 1,3-diphenyltriazine | Red Brown to yellow | Yes | No |
| Alizarine red S | Deep red brown to yellow. | Yes | No |
| Thymal phthalein | Blue-black to colorless | Yes | No |
| Methyl violet 2B | Violet to yellow | No | Yes |
| Quinaldine red | Red to colorless | No | Yes |
| Rose Bengal | Pink to colorless | No | No |

SECTION II-B PRINT-OUT

| Indicator | Color Change on Exposure to Halogen Free Radical | Alkali Addition | Acid Addition |
|---|---|---|---|
| Metanil yellow | Yellow to deep red brown. | No | Yes |
| Thymolsulfonphthalein | Yellow to blue red | No | Yes |
| Xylenol blue | Yellow to red | No | Yes |
| Basic fuchsin | Violet to red | No | No |
| Methyl orange | Yellow to red | No | No |
| Orange IV | Yellow to violet brown | No | Yes |
| Diphenylthiocarbazone | Yellow-green to red-black. | No | No |
| 2,7-dichlorofluorescein | Yellow to green | No | No |
| Paramethyl red | Yellow to red | No | Yes |
| Congo red | Light red to deep blue-grey. | No | No |
| Benzopurpurin 4B | Red to Blue-Violet | No | Yes |
| Alpha-naphthyl red | Yellow to red | No | No |
| Methyl red | do | No | No |
| Phenol red | do | Yes | No |
| Nile blue 2B | Pink to blue | Yes | No |
| Nile blue A | do | Yes | No |
| Phenacetalin | Colorless to red | Yes | No |

In Table II, the entries in Section II–A may be designated as bleach-out in which establishment of the system and exposure to ultraviolet light produces a color more towards the red end of the spectrum from an original color that is more toward the blue end of the system goes from a colored system to a colorless system, whereas the entries in Section II–B may be designated as print-out. Certain of the indicators require pH adjustment in the solution prior to inclusion in the finished batch and also prior to exposure. The major purpose of this pH adjustment is to bring the indicator to the edge of its pH range of color change so that the exposure to light in the presence of the halogen free radical source will kick it over, so to speak, to a complete color change rather rapidly. Those indicators which can use such pH adjustment advantageously are marked with a "yes" in the table and where such pH adjustment is not needed in view of the nature of the menstrum, a "no" is the indication. Alkalies which have been found suitable for raising the pH are alcohol soluble alkali metal hydroxides and the alkaline earth metal hydroxides such as sodium hydroxide and barium hydroxide. These are dissolved in acetone or alcohol and 1% solutions are preferred. Acids suitable for such pH adjustment are organic acids taken from the group consisting of oxalic, citric, tartaric, itaconic, adipic, and the like. Again, these acids are preferably utilized as 1% solutions in methyl alcohol or in acetone.

In order that the color change experienced upon exposure of compositions of the type described to be visible to the observer it is essential that the composition be free from materials which are themselves dark in color, such as rubber, bitumens or asphalts. Furthermore it is necessary that there be a very substantial amount of the free radical source present in the mixture. It is preferred that there be about equal amounts of organic halogen compound and oxygen-hydrogen containing binder (film forming plastic or cellulose or cellulose derivative), by weight and that there be up to about 1 part by weight of acid base indicator for each 7 parts by weight of whichever of the two other constituents is not present in excess.

Noticeable color responses are obtained when the proportion of free radical source is not less than about half and not more than about twice the weight of the oxygen-hydrogen containing binder or support and the weight of acid-base indicator is between about 0.02 and 0.40 part by weight, per total weight of binder or support, and of free radical source.

It will be noted that these proportions are distinctly different from those compositions described in U.S. Patents 1,574,357, and others mentioned in U.S. Patent 1,658,510 and that the color change described in the examples which follow is obtained without recourse to any wet processing since it is produced directly as a consequence of exposure to the ultraviolet radiation.

In addition to the three essential ingredients described above, the compositions may include certain materials which act as sensitizers to the visible. These are generally materials which are in themselves indicators, but which exhibit a pale yellow color in the dried films. While a number of materials appear to be suitable for the purpose, those which are most suitable are azo compounds, two of which appear to be particularly effective, namely, N-N'-dimethylphenylazoaniline and 4-phenylazo-diphenylamine.

Another optional constituent in the systems of the invention are ultraviolet absorbers, effective for increasing the speed of color change on exposure to ultraviolet light. These ultraviolet absorbers are used in minor percentages as illustrated below and a number appear to be effective, including phenylsalicylate, benzil, benzoin, 4-methylumbelliferone, and benzophenone.

Two light sources have been utilized in the examples which follow. The first was a General Electric reflector type sunlamp of 275 watts using a glass envelope and the second was a 300 watt, 4½ inch high-pressure mercury lamp in a quartz envelope. Utilizing the first lamp, generally a complete color change was obtained in a range of 5 to 20 seconds exposure at a distance of 10 inches, and using the second lamp, a complete color change was generally obtained in one to three seconds exposure, due to the much higher intensity of ultraviolet light in the second lamp in the region of 2500 to 3000 A.

The following examples are indicative of specific methods of practice:

EXAMPLE 1

A composition was formulated consisting of: 10 ccs. of 10% solution of polyvinylacetate in a mixture of 40 parts of acetone, 40 parts of methyl alcohol and 20 parts of toluene; 2 ccs. of 2% dispersion of Congo red in acetone; and 5 ccs. of 25% solution of $CBr_4$ in acetone. The mixture was spread on a glass plate in one instance and on a sheet of transparent heat stabilized polyvinyl chloride of 2 mils thickness in the second instance. After allowing the films to air dry until the solvent was completely eliminated, a portion of each of the spread films was masked off and exposed to a 300 watt high pressure mercury lamp at a distance of 10 inches for 3 seconds. The exposed areas developed a deep blue-grey color whereas the unexposed areas were light red. The glass plate was stored in a dark cabinet for 30 days and then reexamined. A slight, but noticeable degree of fogging had developed in the unexposed areas, and this portion was still significantly sensitive to ultraviolet light. The emulsion which had been coated on the polyvinyl chloride base was heated at 100° C. for 30 seconds and was then reexposed to ultraviolet light. The unexposed areas had deepened slightly in hue and intensity of color. This polyvinyl chloride film which had been previously exposed to ultraviolet light and then heat treated was also stored in a dark cabinet for 30 days, after which time no sign of fogging was evident.

EXAMPLE 2

A composition was formulated consisting of: 10 ccs. of a 10% solution of polymethylmethacrylate in a mixture of 30 parts of acetone, 40 parts of ethyl acetate and 30 parts of toluene; 1 cc. of a 2% solution of ethyl violet in $CH_3OH$; and 10 ccs. of a 25% solution of $CBr_4$ in acetone. The composition was spread on a glass plate and allowed to dry until all solvent had been eliminated. It was then exposed to the quartz mercury lamp for a period of 15 seconds, after which the original violet color had turned to a light green.

EXAMPLE 3

The composition of Example 2 was formulated and modified by the addition of 5 ccs. of 10% solution of citric acid in acetone. The solution was spread on a glass plate and exposed to ultraviolet light after thorough drying as in Example 2. In this case again a color change from violet to green took place except that the time of exposure was approximately 6 seconds.

EXAMPLE 4

The same as Example 2 was prepared but with the addition of 10 ccs. of 10% solution of oxalic acid in acetone. The above solution was spread on a glass plate and after thorough drying was exposed to the quartz mercury lamp for ten seconds. The original color in the unexposed condition was blue with a slight violet overtone, and after exposure, the color was a pale yellow.

EXAMPLE 5

A composition was formulated consisting of: 10 ccs. of 10% solution of cellulose acetate in a mixture of 70 parts of acetone and 30 parts of trichloroethylene; 4 ccs. of 3% solution of Orange IV in $CH_3OH$; and 5 ccs. of 25% solution of $CBr_4$ in acetone. After the foregoing mixture had been spread on a glass plate and allowed to dry, it was exposed for 3 seconds to the mercury quartz lamp and produced a color change from pale yellow to a deep grey-brown.

EXAMPLE 6

A composition was formulated consisting of: 10 ccs. of 10% solution of polyvinylacetate in a mixture of acetone, toluene and methyl alcohol; 2 ccs. of 2% dispersion of Congo red in acetone; and 5 ccs. of 15% solution of $CHI_3$ in acetone. Exposure of the foregoing mixture for a period of three seconds after it had been spread on the glass plate and allowed to dry completely gave substantially the identical color change as experienced in Example 1, namely, from a light red to a deep blue-grey.

EXAMPLE 7

A composition was prepared consisting of: 10 ccs. of 10% solution of polystyrene in toluene; 2 ccs. of 2% dispersion of Congo red in acetone; and 5 ccs. of 25% solution of $CBr_4$ in acetone. The mixture was spread on a glass plate and allowed to dry thoroughly, and was then exposed at a distance of 10 inches to the quartz mercury lamp for three minutes. The original color of the film was a very pale pink and no visible color change was obtained, even after this relatively long exposure.

EXAMPLE 8

A mixture was prepared consisting of: 10 ccs. of 10% solution of polyvinylacetate; 0.05 gram of diphenylthiocarbazone; and 10 ccs. of 25% solution of $CBr_4$ in acetone. The dried film spread on glass made from the foregoing mixture exhibited an original color of pale yellow green. After exposure to the quartz lamp for a period of ten seconds, the exposed portions exhibited a deep red-black color.

EXAMPLE 9

A mixture was prepared consisting of: 15 ccs. of 10% solution of polyvinylacetate; 3 ccs. of 2% dispersion of Congo red in acetone; 5 ccs. of 10% solution of ethylene glycol in acetone; 5 ccs. of 25% solution of $CBr_4$ in acetone; 0.01 gram of benzil; and 0.005 gram of N-N'-dimethylphenylazoaniline. The mixture was spread on a glass plate and allowed to dry in a dark box for a period of two hours. It was then exposed for 5 seconds at a distance of 10 inches to the General Electric reflector sunlamp producing radiation which is principally in the visible and producing only a very small proportion in the wavelength region of 3500 to 4000 A. The result of this five second exposure produced a color change similar to that experienced as the result of the teachings of Example 1 except that the development color was deeper and more violet in its nature, and the unexposed portions were very pale orange.

EXAMPLE 10

The same mixture was prepared as in Example 9, except that 0.5 gram of pigment grade $TiO_2$ was added. The mixture was spread on a glass plate and allowed to dry in a dark box for a period of 5 hours. It was then exposed to the mercury quartz lamp at a distance of 10 inches for 15 seconds through a photographic step-wedge showing 25 different shades of grey. The exposed image exhibited its ability to develop continuous tone in that approximately fifteen steps of variation in tone was picked up by the light sensitive material. The most heavily exposed areas were very deep blue-grey, while the more lightly exposed areas tended to be more blue than grey.

EXAMPLE 11

A mixture as prepared consisting of: 1 cc. of 10% solution of polystyrene; 4 ccs. of 2% dispersion of Congo red in acetone; 10 ccs. of 25% solution of $CBr_4$ in acetone; 10 ccs. of 10% ethylene glycol in acetone; and 10 ccs. of acetone. The resulting mixture was deposited on cellulose paper by dipping, draining, and allowing to dry completely. Examination under the microscope indicated that the cellulose fibers were dyed or colored a light pink color. After complete drying over a period of two hours, the paper was then exposed to the mercury quartz lamp and the deep blue-grey specific to Congo red developed out.

EXAMPLE 12

The mixture as defined in Example 1 was spread on a glass plate and permitted to dry for two hours in the dark box. The emulsion was then sprayed with a 5% solution of polystyrene in toluene and allowed to dry. A sufficient intensity of spraying was used for the overcoat so that a thickness of dry polystyrene of the order of 0.5 mil was obtained. This was exposed to ultraviolet light in the usual fashion, and again the typical color change was obtained. In this particular example, a portion of the emulsion was masked from the ultraviolet light and after the exposure, the film was stored in the dark box for 30 days and then examined for fog. No evidence of fog was found. Reexposure of the unexposed areas to ultraviolet light indicated that a very slight sensitivity still remained but not nearly to the extent originally experienced and insufficient to eliminate the utility of the article.

This application is a continuation-in-part of my U.S. patent application Serial No. 841,459, filed September 22, 1959, now abandoned.

I claim:

1. A print-out member consisting of a support and a dry film deposited thereon said film consisting of (1) a film-forming material selected from the group consisting of film forming cellulose derivatives and polymers of vinylidene monomers which contain oxygen and hydrogen in their molecule; (2) an acid-base type indicator selected from the group of complex organic compounds which are soluble in water and water-miscible compounds and which yield a distinctive color change over a narrow range of pH in the presence of at least a trace of water; and (3) at least one halogen containing organic compound reactive with said indicator under the influence of illumination, to produce a change in the color of the film directly and solely as a result of said exposure to light, there being between 0.5 and 2 parts of halogen containing compound for each part by weight of film-forming material and between 0.02 and about 0.40 part by weight of acid-base type indicator for each part by weight of the total of organic halogen containing compound and film-forming material.

2. A dry photographic film producing a visible colored print-out image directly upon exposure to light of a suitable wavelength, said film consisting of (1) a binder selected from the group consisting of paper, cloth and film-forming cellulose derivatives and polymers of vinylidene monomers which contain oxygen and hydrogen in their molecule; (2) an acid-base type indicator selected from the group of complex organic compounds which are soluble in water and water-miscible compounds and which yield a distinctive color change over a narrow range of pH in the presence of at least a trace of water; and (3) a halogen-containing compound selected from the group consisting of carbon tetrabromide, iodoform, bromoform, chloroform, carbon tetrachloride, tetrabrombutane, hexachlorethane, tetrachlortetrahydronaphthalene, dichlorbenzene, dibrombenzene and hexachlorbenzene, each of which is a halogen-containing compound which on exposure to light of a suitable wavelength decomposes to yield free radicals containing a halogen selected from the group consisting of Cl, Br and I; said acid-base indicator and said halogen-containing compound being dispersed throughout said binder, said film containing between 0.5 and 2 parts by weight of organic halogen containing compound per one part by weight of said binder and between 0.02 and 0.40 part by weight of acid-base indicator per part by weight of the total of said organic halogen compound and said film-forming plastic.

3. The film of claim 2 wherein the free halogen radical source is a halogenated methane with at least three halogen atoms attached to the carbon atom.

4. The dry film of claim 2 in which Congo red and carbon tetrabromide are dispersed throughout a binder selected from the group consisting of cellulose and cellulose derivatives.

5. A method of printing out colored images directly as a result of exposing a photosensitive composition to light of a suitable wavelength, which method comprises: preparing a dry photographic film consisting essentially of (1) a film-forming plastic selected from the group consisting of film-forming plastics which contain oxygen and hydrogen in their molecule; (2) an acid-base type indicator selected from the group of complex organic compounds which are soluble in water and water-miscible compounds and which yield a distinctive color change over a narrow range of pH in the presence of at least a trace of water; and (3) a halogen-containing compound selected from the group consisting of carbon tetrabromide, iodoform, bromoform, chloroform, carbon tetrachloride, tetrabrombutane, hexachlorethane, tetrachlortetrahydronaphthalene, dichlorbenzene, dibrombenzene and hexachlorbenzene, each of which is a halogen containing compound which on exposure to light of a suitable wavelength decomposes to yield free radicals containing a halogen selected from the group consisting of Cl, Br, and I; said acid-base indicator and said halogen containing compound being dispersed throughout said film-forming plastic material, there being between about 0.5 and 2 parts of said halogen containing compound for each part by weight of said film-forming plastic material and between about 0.02 and 0.40 part by weight of said acid-base indicator for each part of the total of organic halogen compound and film-forming plastic in said film; and exposing selected portions of said film to a source of light having a wavelength between about 2500 A. and 4000 A., whereby a reaction occurs producing a visible color change in the film directly and solely as a result of said exposure.

6. A method of printing out colored images directly as a result of exposing a photosensitive composition to light of a suitable wavelength, which method comprises: preparing a dry photographic film consisting of (1) a film-forming plastic selected from the group consisting of film-forming plastics which contain oxygen and hydrogen in their molecule; (2) an acid-base type indicator selected from the group of complex organic compounds which are soluble in water and water-miscible compounds and which yield a distinctive color change over a narrow range of pH in the presence of at least a trace of water; and (3) at least one halogen containing organic compound reactive with said indicator under the influence of illumination, to produce a change in the color of the film directly and solely as a result of said exposure to light; said acid-base indicator and said halogen containing compound being dispersed throughout said film forming plastic material, there being between 0.5 and 2 parts of said halogen containing compound for each part by weight of said film-forming plastic material and between 0.02 and 0.40 part by weight of said acid-base indicator for each part of the total of organic halogen compound and film-forming plastic in said film; and exposing selected portions of said film to a source of light having a wavelength between about 2500 A. and 4000 A., whereby a reaction occurs producing a visible color change in the film directly and solely as a result of said exposure.

References Cited in the file of this patent

UNITED STATES PATENTS

| | | |
|---|---|---|
| 1,574,357 | Beebe et al. | Feb. 23, 1926 |
| 1,658,510 | Beebe et al. | Feb. 7, 1928 |

FOREIGN PATENTS

| | | |
|---|---|---|
| 542,598 | Germany | Jan. 26, 1932 |